(12) United States Patent
Konno

(10) Patent No.: US 12,337,927 B2
(45) Date of Patent: Jun. 24, 2025

(54) REAR WHEEL SUSPENSION DEVICE

(71) Applicant: SUZUKI MOTOR CORPORATION, Hamamatsu (JP)

(72) Inventor: Takeshi Konno, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 305 days.

(21) Appl. No.: 18/075,948

(22) Filed: Dec. 6, 2022

(65) Prior Publication Data

US 2023/0182854 A1 Jun. 15, 2023

(30) Foreign Application Priority Data

Dec. 10, 2021 (JP) .................................. 2021-200967

(51) Int. Cl.
*B62K 25/20* (2006.01)
*B62K 11/04* (2006.01)
*B62K 25/04* (2006.01)

(52) U.S. Cl.
CPC .............. *B62K 25/20* (2013.01); *B62K 11/04* (2013.01); *B62K 2025/045* (2013.01)

(58) Field of Classification Search
CPC .......... B62K 2025/045; B62K 2025/26; B62K 2025/283; B62K 2025/286
USPC ................................ 280/5.514, 6.157, 6.159
See application file for complete search history.

(56) References Cited

U.S. PATENT DOCUMENTS

| | | | | |
|---|---|---|---|---|
| 4,765,432 A | * | 8/1988 | Odom | B62J 1/12 180/227 |
| 5,348,112 A | * | 9/1994 | Vaillancourt | F16F 9/44 280/5.514 |
| 5,711,390 A | * | 1/1998 | Hikichi | B62K 25/283 280/5.513 |
| 5,816,357 A | * | 10/1998 | Camlin | B62K 25/283 280/275 |

(Continued)

FOREIGN PATENT DOCUMENTS

| | | |
|---|---|---|
| EP | 1 614 613 A2 | 7/2005 |
| JP | 2003-104266 A | 4/2003 |
| JP | 2004224311 A * | 8/2004 |

OTHER PUBLICATIONS

JP_2004224311_A (Year: 2004).*

(Continued)

*Primary Examiner* — Christopher B Wehrly
(74) *Attorney, Agent, or Firm* — Stein IP, LLC

(57) ABSTRACT

A rear wheel suspension device includes: a swing arm swingably supported with respect to a vehicle body frame, the swing arm being configured to rotatably support a rear wheel; a rear cushion configured to be extended and contracted in accordance with swing of the swing arm; a cushion lever coupled to a lower end portion of the rear cushion; a cushion rod coupling the cushion lever and the swing arm; an accumulator storing a working fluid that extends and contracts the cushion rod; and an accumulator bracket supporting the accumulator. A vehicle height is adjusted by displacement of the swing arm in accordance with extension and contraction of the cushion rod. A muffler pipe extends rearward from an engine through a side of the accumulator. The accumulator bracket is configured to separate the accumulator and the muffler pipe.

6 Claims, 8 Drawing Sheets

(56) References Cited

U.S. PATENT DOCUMENTS

| | | | |
|---|---|---|---|
| 6,823,958 B2* | 11/2004 | Domenicali | B62K 25/286 |
| | | | 280/285 |
| 2005/0116437 A1* | 6/2005 | Furukawa | B62K 25/283 |
| | | | 280/124.128 |
| 2019/0152557 A1* | 5/2019 | Seidl | B62K 25/08 |

OTHER PUBLICATIONS

German Office Action dated Apr. 14, 2025, issued by the German Patent and Trademark Office in corresponding application DE 102022132469.9.

* cited by examiner

REAR WHEEL SUSPENSION DEVICE

CROSS-REFERENCE TO RELATED APPLICATIONS

The disclosure of Japanese Patent Application No. 2021-200967 filed on Dec. 10, 2021, including specification, drawings and claims is incorporated herein by reference in its entirety.

BACKGROUND

The present invention relates to a rear wheel suspension device.

In the related art, a rear wheel suspension device (rear suspension) of a swing arm type has been adopted in a straddle-type vehicle (see, for example, Patent Literature 1). In the rear wheel suspension device described in Patent Literature 1, a swing arm is swingably supported by a vehicle body frame, and a rear wheel is rotatably supported by a rear end of the swing arm. A rear cushion is coupled to the swing arm via a link mechanism, and unevenness of a road surface is absorbed by the rear cushion. In recent years, a vehicle height adjustment device called a ride height adjuster or the like may be additionally provided in such a rear wheel suspension device for the straddle-type vehicle.
Patent Literature 1: JP2003-104266A

SUMMARY

A rear wheel suspension device according to an aspect of the present invention is a rear wheel suspension device including a swing arm swingably supported with respect to a vehicle body frame, the swing arm being configured to rotatably support a rear wheel, the rear wheel suspension device including: a rear cushion configured to be extended and contracted in accordance with swing of the swing arm; a cushion lever coupled to a lower end portion of the rear cushion; a cushion rod coupling the cushion lever and the swing arm; an accumulator storing a working fluid that extends and contracts the cushion rod; and an accumulator bracket supporting the accumulator, in which a vehicle height is adjusted by displacement of the swing arm in accordance with extension and contraction of the cushion rod, a muffler pipe extends rearward from an engine through a side of the accumulator, and the accumulator bracket is configured to separate the accumulator and the muffler pipe.

DESCRIPTION OF EMBODIMENTS

Components of the vehicle height adjustment device are often disposed on an upper side of the vehicle due to the restriction of an arrangement space of the straddle-type vehicle, but in consideration of the stability of the vehicle, the components are preferably disposed on a lower side of the vehicle body so that the center of gravity of the vehicle does not rise. However, since the muffler pipe is located on the lower side of the vehicle body, there is a problem that the components of the vehicle height adjustment device are influenced by heat.

The present invention has been made in view of the above, and an object of the present invention is to provide a rear wheel suspension device capable of reducing an influence of heat from a muffler pipe on a component of a vehicle height adjustment device.

According to the rear wheel suspension device of one aspect of the present invention, the vehicle height is adjusted by extending and contracting the cushion rod by the working fluid of the accumulator. The vehicle height of the rear portion of the vehicle is lowered at the time of starting, or at the exit of a corner, so that stable acceleration can be performed in a posture in which the center of gravity is low. In addition, the accumulator bracket is disposed between the accumulator and the muffler pipe, so that the accumulator is protected from the hot air of the muffler pipe by the accumulator bracket.

In a rear wheel suspension device according to an aspect of the present invention, a swing arm is swingably supported with respect to a vehicle body frame, and a rear wheel is rotatably supported by the swing arm. With the swing of the swing arm, a rear cushion is extended and contracted to absorb the unevenness of a road surface. A cushion lever is coupled to a lower end portion of the rear cushion, and the cushion lever and the swing arm are connected by a cushion rod. The cushion rod is extended and contracted by a working fluid, and the working fluid is stored in an accumulator. The cushion rod extends and contracts by the working fluid in the accumulator, and a vehicle height is adjusted by displacement of the swing arm accompanying the expansion and contraction of the cushion rod. The vehicle height of the rear portion of the vehicle is lowered at the time of starting, or at the exit of a corner, so that stable acceleration can be performed in a posture in which the center of gravity is low. Further, a muffler pipe extends rearward from the engine through a side of the accumulator, and the accumulator and the muffler pipe are separated by an accumulator bracket. The accumulator is protected from the hot air of the muffler pipe by the accumulator bracket.

EMBODIMENTS

Figure 1:
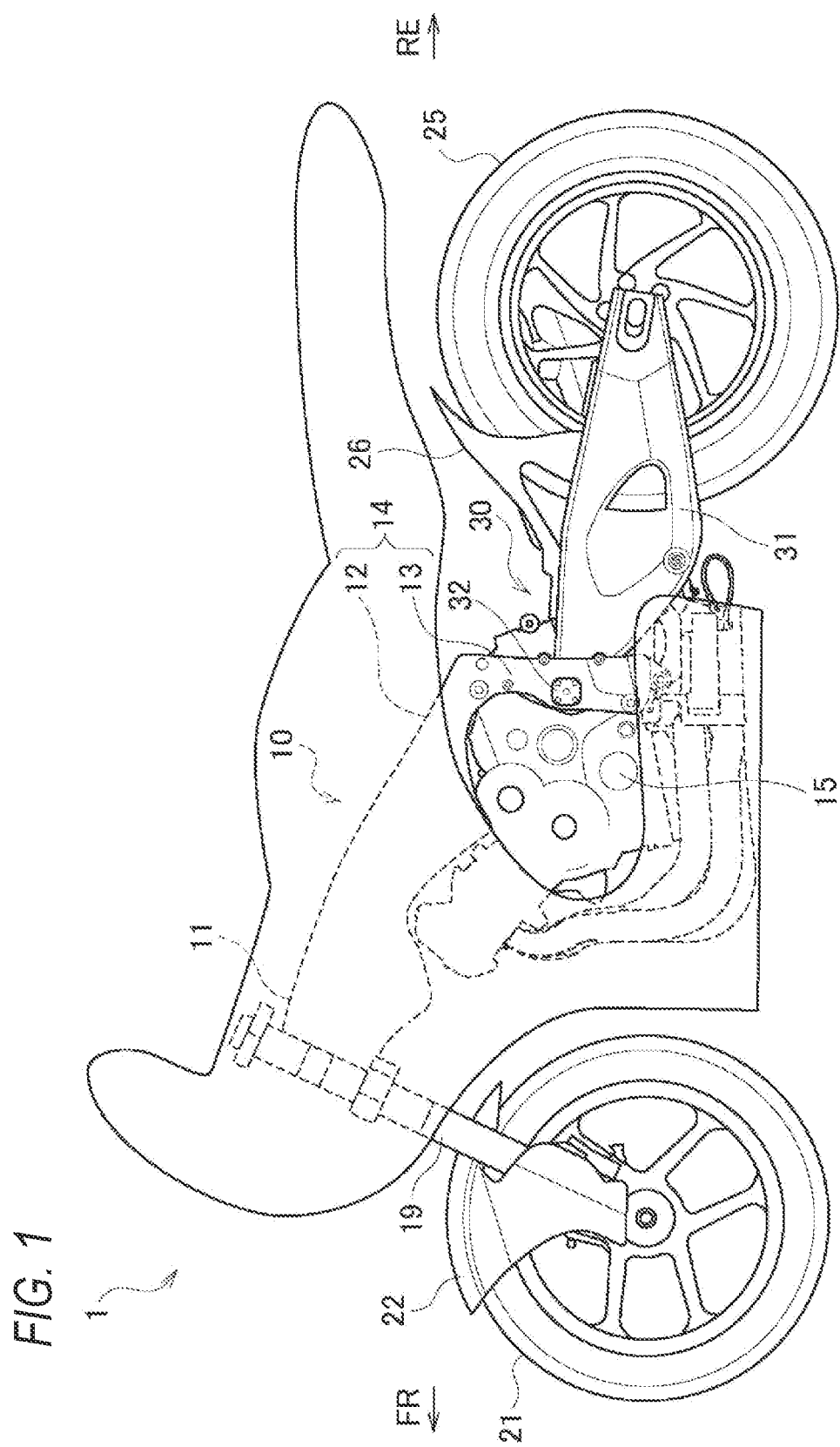
FIG. 1 is a left side view of a straddle-type vehicle according to the present embodiment.

Hereinafter, an embodiment will be described in detail with reference to the accompanying drawings. FIG. 1 is a left side view of a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is formed by mounting various components such as an engine 15 and an electrical system on a vehicle body frame 10 formed of a pipe and a sheet metal. A main frame 14 branches from a head pipe 11 of the vehicle body frame 10 to left and right and extends to a rear side. A front side portion of the main frame 14 is a tank rail 12 located on an upper side of the engine 15, and a fuel tank (not shown) is supported by the tank rail 12 from below. A rear side portion of the main frame 14 is a pivot frame 13 located on the rear side of the engine 15, and a swing arm 31 is swingably supported by the pivot frame 13.

A front fork 19 is steerably supported by the head pipe 11 via a steering shaft (not shown). A front wheel 21 is rotatably supported by a lower portion of the front fork 19, and an upper portion of the front wheel 21 is covered with a front fender 22. The swing arm 31 extends from the pivot frame 13 to the rear side. A rear wheel 25 is rotatably supported at a rear end of the swing arm 31, and a front side of the rear wheel 25 is covered with a rear fender 26. The engine 15 is coupled to the rear wheel 25 via a chain drive type transmission mechanism, and power from the engine 15 is transmitted to the rear wheel 25 via the transmission mechanism.

A rear wheel suspension device 30 of the straddle-type vehicle 1 is additionally provided with a vehicle height adjustment device 50 (see FIG. 2) for lowering the center of gravity of the vehicle by adjusting the vehicle height for the purpose of increasing the wheelie limit to improve acceleration. The vehicle height adjustment device 50 is provided with an accumulator 51 (see FIG. 2) that stores oil for vehicle height adjustment (working fluid). The accumulator 51 is often disposed inside a seat cowl or on a side of the vehicle body frame 10, but if a heavy object such as the accumulator 51 is disposed on the upper side of the vehicle, the center of gravity cannot be sufficiently lowered. Therefore, in the rear wheel suspension device 30 of the present embodiment, an arrangement space for the accumulator 51 is secured on the lower side of the swing shaft 32 of the swing arm 31.

Figure 2:
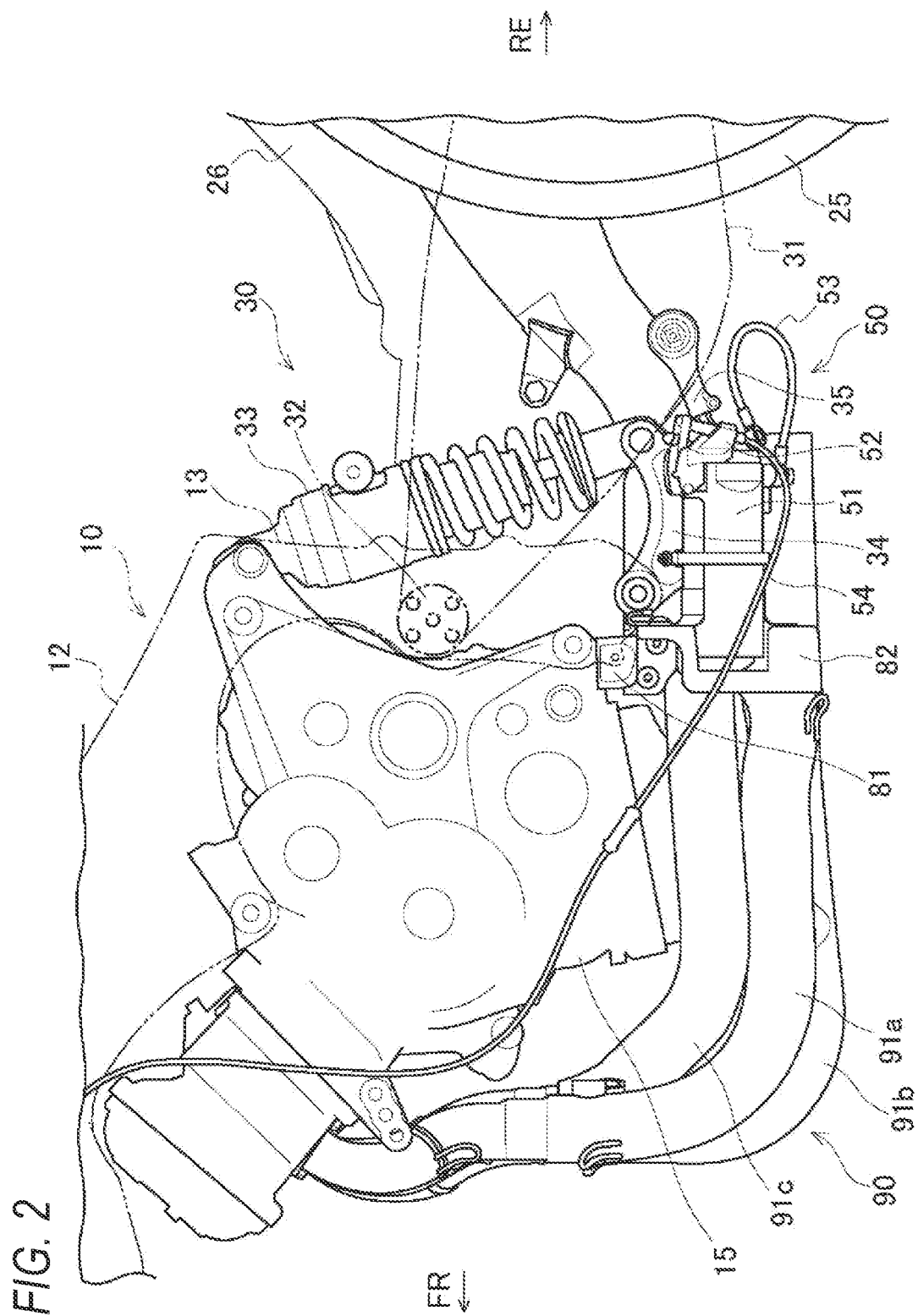
FIG. 2 is a left side view of a rear wheel suspension device according to the present embodiment.
Figure 3:
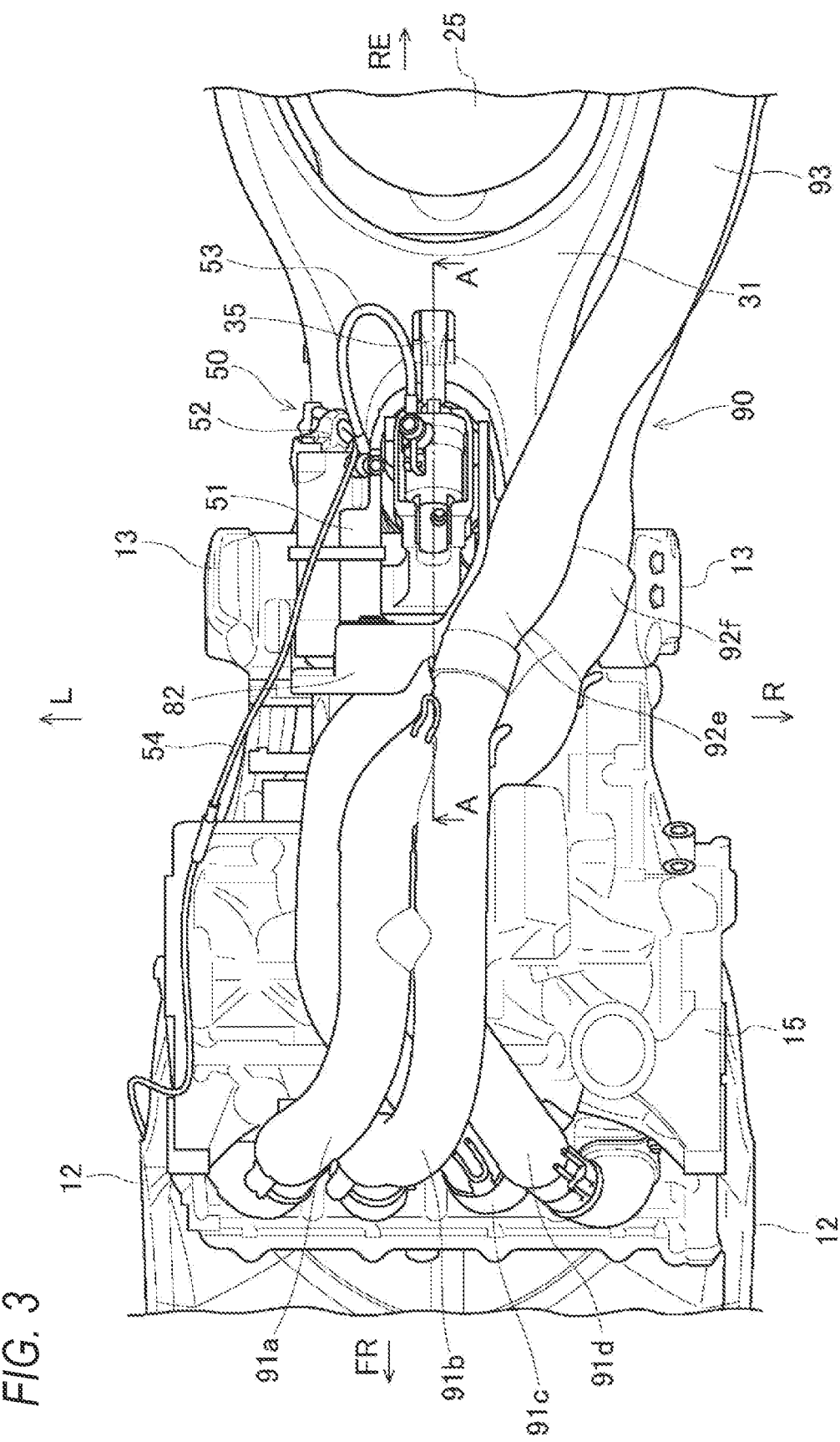
FIG. 3 is a bottom view of the rear wheel suspension device according to the present embodiment.
Figure 4:
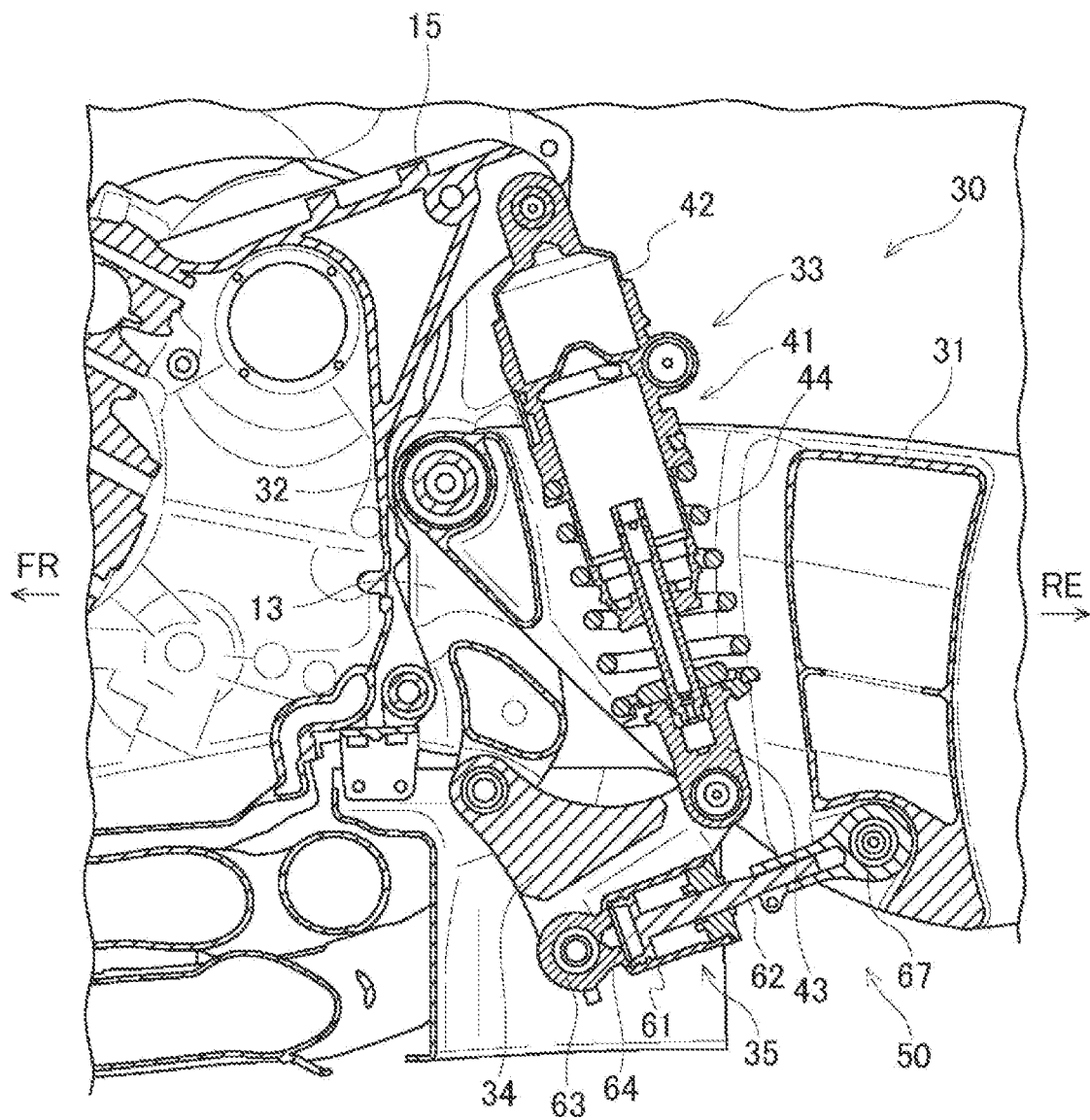
FIG. 4 is a cross-sectional view of the rear wheel suspension device shown in FIG. 3 taken along a line A-A.
Figure 5A:
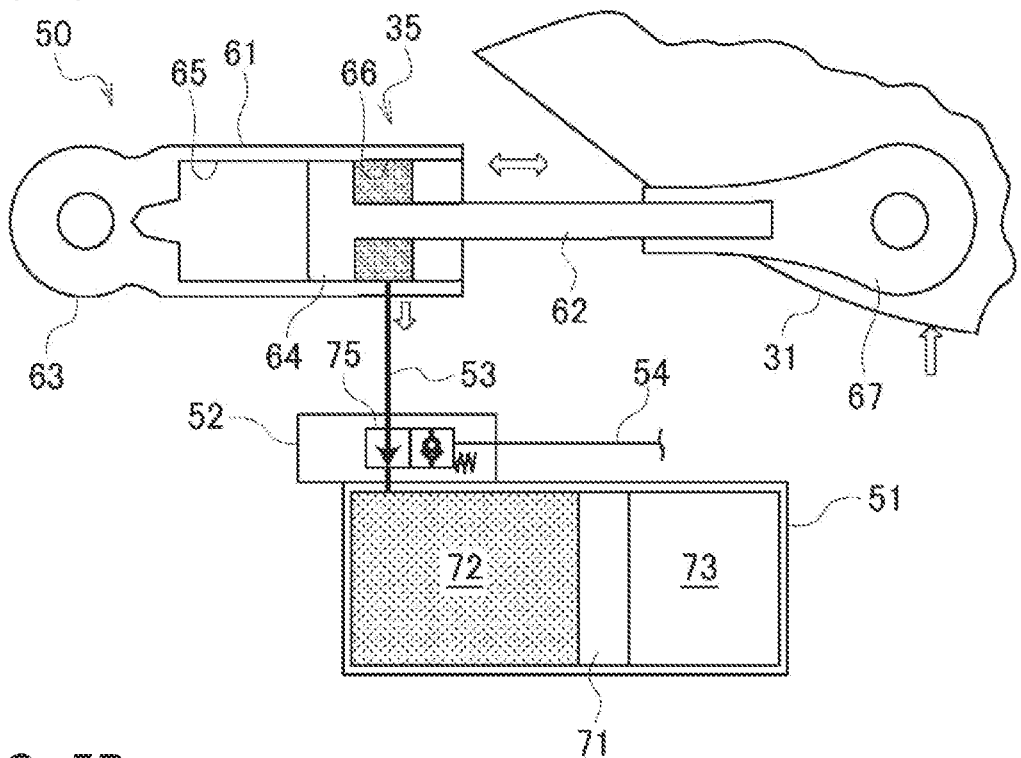
FIG. 5A and FIG. 5B are schematic view of a vehicle height adjustment device according to the present embodiment.
Figure 5B:
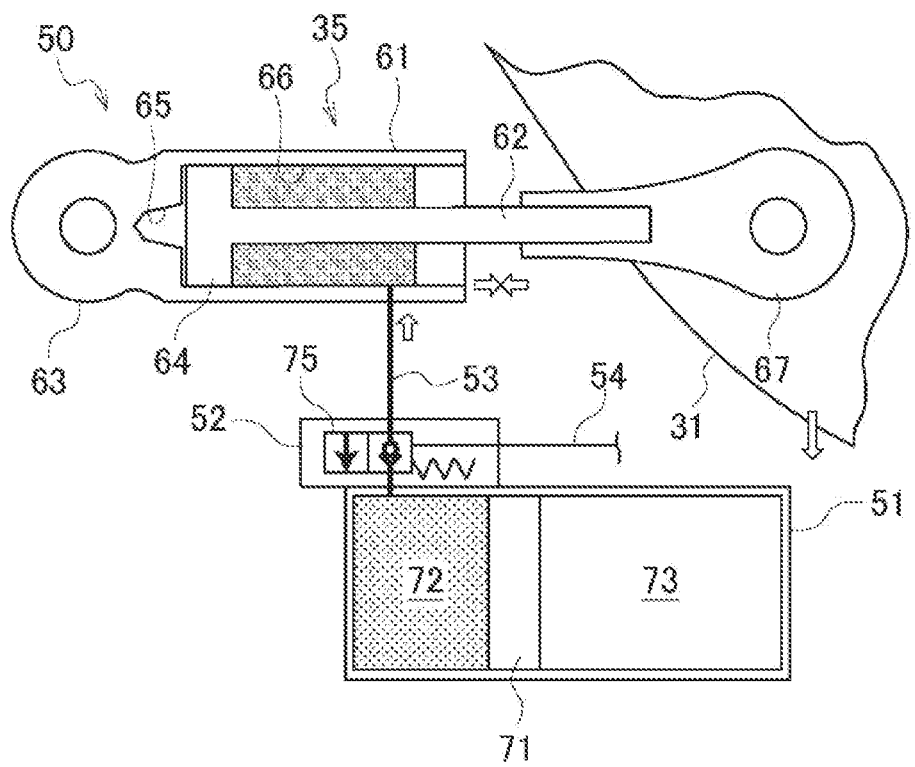

The rear wheel suspension device for the straddle-type vehicle will be described with reference to FIGS. 2 to 5. FIG. 2 is a left side view of the rear wheel suspension device according to the present embodiment. FIG. 3 is a bottom view of the rear wheel suspension device according to the present embodiment. FIG. 4 is a cross-sectional view of the rear wheel suspension device shown in FIG. 3 taken along a line A-A. FIG. 5A and FIG. 5B are schematic view of the vehicle height adjustment device according to the present embodiment. In FIG. 2, for convenience of explanation, the vehicle body frame and the swing arm are indicated by two-dot chain lines. FIG. 5A shows an extended state of a link rod, and FIG. 5B shows a contracted state of the link rod.

As shown in FIG. 2, the rear wheel suspension device 30 of a swing arm type is attached to the engine 15 and the pivot frame 13. The double-supported swing arm 31 is swingably supported at an intermediate position in a height direction of the pivot frame 13 via the swing shaft 32. The swing arm 31 is coupled to the engine 15 and the pivot frame 13 via a rear cushion 33, a cushion lever 34, and a cushion rod 35. The rear cushion 33 extends and contracts in accordance with the swing of the swing arm 31, so that unevenness of a road surface is absorbed, vibration is reduced, and ground contact between the road surface and the rear wheel 25 is improved.

An upper end portion of the rear cushion 33 is supported by upper portions of the engine 15 and the pivot frame 13, and a rear apex portion of the cushion lever 34 having a substantially triangular shape in a side view is coupled to a lower end portion of the rear cushion 33. A front apex portion of the cushion lever 34 is coupled to a lower portion of the pivot frame 13, and a lower apex portion (see FIG. 4) of the cushion lever 34 is coupled to a lower portion of the swing arm 31 via the extensible cushion rod 35. Along with the swing of the swing arm 31, the cushion lever 34 is swung with the front apex portion as a fulcrum, and an impact or the like from the road surface is transmitted from the swing arm 31 to the rear cushion 33.

An accumulator bracket 82 is attached to a lower portion of the engine 15 via a suspension bracket 81. The accumulator 51 is supported by the accumulator bracket 82, and oil for extending and contracting the cushion rod 35 is stored in the accumulator 51. The accumulator 51 is provided with a plunger switch 52, and the plunger switch 52 is coupled to the cushion rod 35 via a coupling hose 53. The movement of the oil in the coupling hose 53 is controlled by the plunger switch 52. An operation portion (not shown) is coupled to the plunger switch 52 via an operation cable 54.

In the rear wheel suspension device 30, the cushion rod 35 is extended and contracted by the hydraulic pressure, and the swing arm 31 is displaced in accordance with the extension and contraction of the cushion rod 35, so that the vehicle height of the straddle-type vehicle 1 is adjusted. As described above, the vehicle height adjustment device 50 including the cushion rod 35, the accumulator 51, the plunger switch 52, the coupling hose 53, and the operation cable 54 is provided in a lower portion of the rear wheel suspension device 30. At this time, the accumulator 51, which is a heavy component, is positioned on the lower side of the vehicle body frame 10 to lower the center of gravity of the straddle-type vehicle 1. A detailed configuration of the vehicle height adjustment device 50 will be described later.

As shown in FIGS. 2 and 3, a muffler pipe 90 extends to the rear side from a front surface of the engine 15 through a side (right side in the present embodiment) of the accumulator 51. In front of the accumulator 51, the muffler pipe 90 is divided into four left and right branch pipes 91a to 91d. On the side of the accumulator 51, two left branch pipes 91a and 91b are collected into a lower pipe 92e, and two right branch pipes 91c and 91d are collected into an upper pipe 92f. At the rear side of the accumulator 51, the lower pipe 92e and the upper pipe 92f are collected into one collecting pipe 93, and the collecting pipe 93 is connected to a muffler (not shown) in the vicinity of the rear wheel 25.

At the lower side of the vehicle body frame 10, the lower pipe 92e and the upper pipe 92f of the muffler pipe 90 are disposed closer to the right side (one side in the left-right direction), and the vehicle height adjustment device 50 is disposed closer to the left side (the other side in the left-right direction). The front and right sides of the vehicle height adjustment device 50 are covered by the accumulator bracket 82, and the vehicle height adjustment device 50 and the muffler pipe 90 are partitioned by the accumulator bracket 82. Even if the vehicle height adjustment device 50 is provided adjacent to the muffler pipe 90, each component of the vehicle height adjustment device 50 is protected from the hot air of the muffler pipe 90. The detailed configuration of the accumulator bracket 82 will be described later.

As shown in FIG. 4, a shock absorber 41 of the rear cushion 33 is divided into an upper cylinder 42 and a lower piston rod 43 (the piston is not shown). The cylinder 42 of the shock absorber 41 is supported by the engine 15, and the piston rod 43 of the shock absorber 41 is coupled to the cushion lever 34. The cylinder 42 and the piston rod 43 of the shock absorber 41 are elastically coupled by a coil spring 44. The rear cushion 33 absorbs the impact from the road surface by the coil spring 44, and attenuates the amplitude of the coil spring 44 by the shock absorber 41.

The rear cushion 33 is inserted into an opening on the front side of the swing arm 31, and the rear cushion 33 is brought close to the swing shaft 32 of the swing arm 31. The cushion lever 34 is positioned on the lower side of the swing shaft 32, and the pivot frame 13, the rear cushion 33, and the swing arm 31 are coupled by the cushion lever 34. A lower portion of the cushion lever 34 is formed in a U shape in a sectional view (see FIG. 8), and the cushion rod 35 is accommodated in a lower portion of the U shape. A link mechanism that couples the swing arm 31 and the rear cushion 33 is formed by the cushion lever 34 and the cushion rod 35.

As shown in FIGS. 4 and 5A, the cushion rod 35 of the vehicle height adjustment device 50 includes a cylinder 61 formed in a tubular shape and a rod main body 62 protruding from the cylinder 61. The cylinder 61 is formed with a lever-side coupling portion 63, and the cylinder 61 is coupled to the cushion lever 34 via the lever-side coupling portion 63. A piston 64 that slides in the cylinder 61 is formed at a front end of the rod main body 62, and the inside of the cylinder 61 is divided into an atmospheric chamber 65 and an oil chamber 66 by the piston 64. An arm-side coupling portion 67 is provided on a rear end of the rod main body 62, and the rod main body 62 is coupled to the swing arm 31 via the arm-side coupling portion 67.

The oil chamber 66 of the cylinder 61 of the cushion rod 35 communicates with a high pressure oil chamber 72 of the accumulator 51 through the coupling hose 53 and the plunger switch 52. The accumulator 51 is formed in a tubular shape, and the inside of the accumulator 51 is divided into the high pressure oil chamber 72 and a high pressure gas chamber 73 by a piston 71. The plunger switch 52 is provided with a control valve 75 that controls the movement of oil between the accumulator 51 and the cushion rod 35. The operation cable 54 is coupled to the control valve 75, and movement of oil from the cushion rod 35 to the accumulator 51 is allowed by operating the operation cable 54.

When the oil moves between the cushion rod 35 and the accumulator 51, a length of the cushion rod 35 changes. When the oil moves from the cushion rod 35 to the accumulator 51, the oil chamber 66 of the cushion rod 35 is narrowed and the cushion rod 35 becomes longer. When the oil moves from the accumulator 51 to the cushion rod 35, the oil chamber 66 of the cushion rod 35 is expanded and the cushion rod 35 becomes shorter. When the cushion rod 35 becomes longer, the swing arm 31 moves to the upper side and the vehicle height of the rear portion of the vehicle becomes lower, and when the cushion rod 35 becomes shorter, the swing arm 31 moves to the lower side and the vehicle height of the rear portion of the vehicle returns to the original height.

More specifically, as shown in FIG. 5A, an upward force acts on the swing arm 31 due to a reaction force of the weight of the vehicle and an occupant. At this time, a tensile force acts on the cushion rod 35, and the oil in the cylinder 61 is compressed by the piston 64 of the cushion rod 35. When the operation cable 54 is operated by the occupant, the control valve 75 of the plunger switch 52 coupled to the operation cable 54 is opened. The oil is pushed out from the cylinder 61 of the cushion rod 35, and the oil moves to the high pressure oil chamber 72 of the accumulator 51 through the coupling hose 53.

The piston 64 of the cushion rod 35 moves in a direction to narrow the oil chamber 66, and the rod main body 62 integrated with the piston 64 protrudes from the cylinder 61, so that the cushion rod 35 becomes longer. When the cushion rod 35 becomes longer, the swing arm 31 is inclined upward from an initial state. As a result, the vehicle height of the rear portion of the vehicle is lowered, and stable acceleration can be achieved in a posture in which the center of gravity is low. The vehicle height of the rear portion of the vehicle is lowered at the time of starting, or at the exit of a corner, so that stable acceleration can be performed in a posture in which the center of gravity is low. In addition, energy from the engine 15 or the like is not used when the vehicle height is lowered.

As shown in FIG. 5B, when the operation cable 54 is not operated, the control valve 75 of the plunger switch 52 is closed and switched to a one-way valve. The one-way valve restricts the movement of the oil from the cushion rod 35 to the accumulator 51, and therefore, the cushion rod 35 is prevented from becoming long. Since the oil is allowed to move from the accumulator 51 to the cushion rod 35 through the one-way valve, the cushion rod 35 is not restricted from being shortened. In this way, only the contraction of the cushion rod 35 is allowed by closing the control valve 75 of the plunger switch 52.

When a load moves to a front portion of the vehicle and a load of the rear portion of the vehicle decreases during braking of the vehicle, a downward force acts on the swing arm 31 due to the weights of the swing arm 31 and the rear wheel 25 and a repulsive force of the rear cushion 33. At this time, a compressive force acts on the cushion rod 35, and the piston 64 of the cushion rod 35 expands the oil chamber 66 of the cylinder 61. Although the control valve 75 is closed, the oil is allowed to move toward the cushion rod 35 through the one-way valve. The oil is drawn into the cylinder 61 of the cushion rod 35, and the oil moves from the high pressure oil chamber 72 of the accumulator 51 through the coupling hose 53.

The piston 64 of the cushion rod 35 moves in a direction to expand the oil chamber 66, and the rod main body 62 integrated with the piston 64 enters the cylinder 61, so that the cushion rod 35 is shortened. When the cushion rod 35 is shortened, the swing arm 31 is inclined downward and returned to the initial state, and the rear portion of the vehicle is raised to an original vehicle height. In addition, even if the vehicle body load is slightly changed during linear travel, the oil is gradually moved from the accumulator 51 to the cushion rod 35, and the vehicle height of the rear portion of the vehicle is gradually returned. In addition, energy from the engine 15 or the like is not used when the vehicle height is returned.

Figure 6:
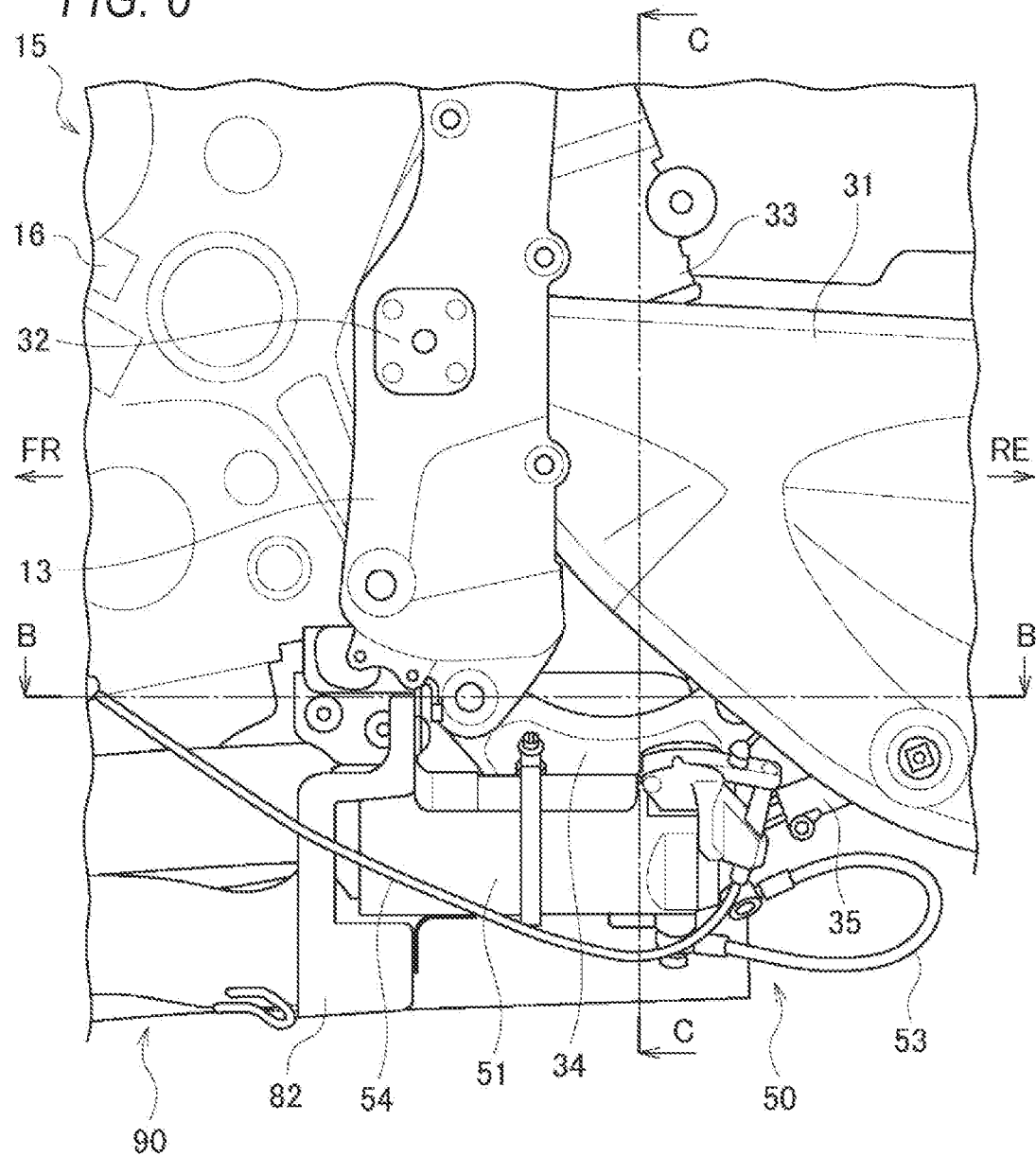
FIG. 6 is a side view of the vicinity of the vehicle height adjustment device according to the present embodiment.
Figure 7:
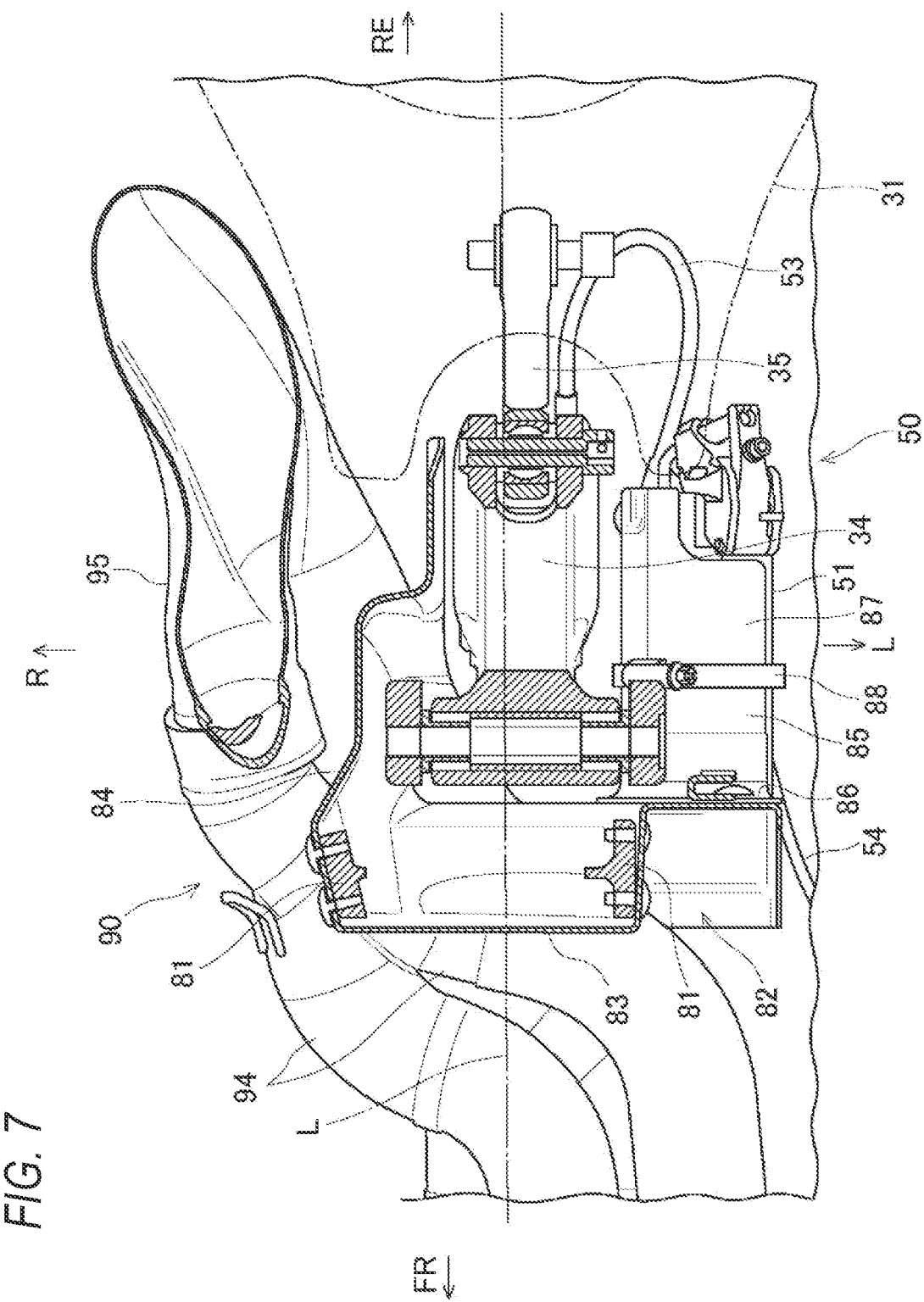
FIG. 7 is a cross-sectional view of the vehicle height adjustment device shown in FIG. 6 taken along a line B-B.
Figure 8:
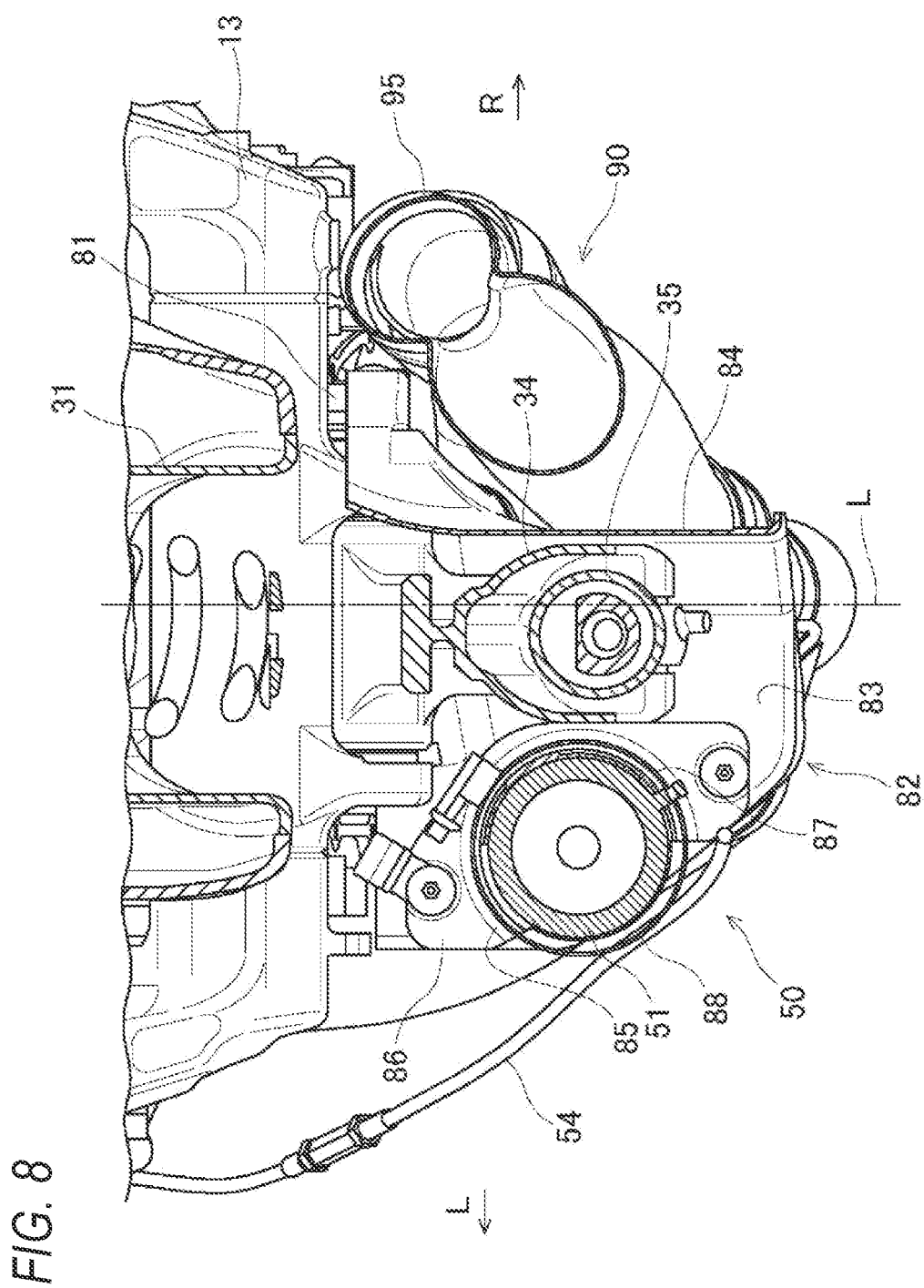
FIG. 8 is a cross-sectional view of the vehicle height adjustment device shown in FIG. 6 taken along a line C-C.

The layout of the accumulator and the accumulator bracket will be described with reference to FIGS. 6 to 8. FIG. 6 is a side view of the vicinity of the vehicle height adjustment device according to the present embodiment. FIG. 7 is a cross-sectional view of the vehicle height adjustment device shown in FIG. 6 taken along a line B-B. FIG. 8 is a cross-sectional view of the vehicle height adjustment device shown in FIG. 6 taken along a line C-C. In FIG. 8, for convenience of explanation, the swing arm is indicated by a two-dot chain line.

As shown in FIG. 6, the accumulator 51 is positioned on the lower side of the pivot frame (vehicle body frame) 13 in the upper-lower direction of the vehicle, so that the center of gravity of the vehicle is kept low. In the front-rear direction of the vehicle, the accumulator 51 is closer to the swing shaft 32 of the swing arm 31 than the lower end portion of the rear cushion 33 (see FIG. 4), and the center of gravity of the vehicle is closer to the center in the vehicle front-rear direction. At this time, since the accumulator 51 is brought close to the vicinity of a swing center of the swing arm 31, the accumulator 51 is deviated from a swing range of the swing arm 31, and interference between the swing arm 31 and the accumulator 51 is prevented.

As shown in FIGS. 6 and 7, the accumulator 51 is positioned on the side of the cushion lever 34 and the cushion rod 35, and the accumulator 51 is overlapped the cushion lever 34 and the cushion rod 35 in a side view of the vehicle. Accordingly, the components of the vehicle height adjustment device 50 are collectively disposed, and the coupling hose 53 coupling the accumulator 51 and the cushion rod 35 is shortened, so that the maintainability is improved. In the side view of the vehicle, the accumulator 51 is located directly below the pivot frame 13 and is overlapped the muffler pipe 90 passing below the pivot frame 13. The accumulator 51 is arranged in the muffler pipe 90, so that the center of gravity is lowered.

Further, the muffler pipe 90 is bent in front of the accumulator 51 and extends rearward through the right side of a vehicle center line L, and the accumulator 51 is positioned on the left side of the vehicle center line L. More specifically, the cushion lever 34 and the cushion rod 35 are offset by 10 mm to one side (left side) with respect to the vehicle center line L extending in the vehicle front-rear direction, and the accumulator 51 is disposed on the left side with respect to the cushion lever 34 and the cushion rod 35. Since the muffler pipe 90 is shifted to the right side with respect to the vehicle center line L, an arrangement space of the accumulator 51 is secured on the left side of the vehicle center line L.

As shown in FIGS. 7 and 8, the vehicle height adjustment device 50 and the muffler pipe 90 are partitioned by the accumulator bracket 82. The accumulator bracket 82 is fixed to a crankcase 16 of the engine 15 (see FIG. 6) via the suspension bracket 81. The accumulator bracket 82 is formed in a substantially L-shaped plate shape in a top view by a front wall portion 83 that covers the vehicle height adjustment device 50 from the front side and a side wall portion 84 that covers the vehicle height adjustment device 50 from the right side (one side). The accumulator bracket 82 is preferably formed of an aluminum alloy having a high thermal reflectance, stainless steel having a low thermal conductivity, or the like.

A C-shaped tubular accumulator holder 85 for holding the accumulator 51 is fixed to a left end side of a rear surface of the front wall portion 83 of the accumulator bracket 82. A flange 86 is formed at a front end of the accumulator holder 85, and the flange 86 is screwed to the front wall portion 83 of the accumulator bracket 82, so that the accumulator holder 85 is cantilevered on the front wall portion 83. The accumulator 51 is inserted into a tubular portion 87 of the accumulator holder 85, and a fastening band 88 is fastened from the outside of the tubular portion 87, so that the accumulator 51 is held by the accumulator holder 85.

In front of the vehicle height adjustment device 50, the muffler pipe 90 is bent to the right side, and a bent portion 94 of the muffler pipe 90 is positioned in front of the front wall portion 83 of the accumulator bracket 82. The front wall portion 83 of the accumulator bracket 82 extends in a plate shape in the upper-lower and left-right directions, and the front wall portion 83 partitions components such as the accumulator 51, the cushion lever 34, and the cushion rod 35 from the bent portion 94 of the muffler pipe 90. Traveling wind is blocked by the front wall portion 83 of the accumulator bracket 82, and the components such as the accumulator 51, the cushion lever 34, and the cushion rod 35 are protected from the hot air flowing to the rear side together with the traveling wind from the bent portion 94 of the muffler pipe 90.

On the right side of the vehicle height adjustment device 50, a downstream portion 95 (the lower pipe 92e and the upper pipe 92f) extends to the rear side from the bent portion 94 of the muffler pipe 90, and the downstream portion 95 of the muffler pipe 90 is positioned on the right side of the side wall portion 84 of the accumulator bracket 82. The side wall portion 84 of the accumulator bracket 82 extends in a plate shape in the upper-lower and front-rear directions, and the side wall portion 84 partitions components such as the accumulator 51, the cushion lever 34, and the cushion rod 35 from the downstream portion 95 of the muffler pipe 90. The heat of the downstream portion 95 of the muffler pipe 90 is blocked by the side wall portion 84 of the accumulator bracket 82, and the components such as the accumulator 51, the cushion lever 34, and the cushion rod 35 are protected.

In this way, the muffler pipe 90 is bent to the right side in front of the cushion lever 34, so that an arrangement space of the accumulator 51 is secured on the left side of the cushion lever 34. The muffler pipe 9) and the accumulator 51 are arranged on the left and right sides with the cushion lever 34 interposed therebetween, so that the center of gravity of the vehicle is lowered. In addition, the accumulator 51 is covered by the accumulator bracket 82 from the front side and the right side, so that the accumulator 51 is protected from the heat of the muffler pipe 90. Therefore, the center of gravity of the vehicle is lowered while the influence of the heat from the muffler pipe 90 is reduced.

As described above, according to the present embodiment, the cushion rod 35 is extended and contracted by the working fluid of the accumulator 51 to adjust the vehicle height. The vehicle height of the rear portion of the vehicle is lowered at the time of starting, or at the exit of a corner, so that stable acceleration can be performed in a posture in which the center of gravity is low. In addition, the accumulator bracket 82 is disposed between the accumulator 51 and the muffler pipe 90, so that the accumulator 51 is protected from the hot air of the muffler pipe 90 by the accumulator bracket 82.

In the present embodiment, the accumulator is positioned on the lower side of the pivot frame. Alternatively, the accumulator may be positioned on the lower side of the swing shaft of the swing arm. Even if the accumulator is added, the center of gravity of the vehicle can be kept low if the accumulator is positioned on the lower side of the swing shaft of the swing arm.

Further, in the present embodiment, the cushion rod is extended and contracted by the oil. Alternatively, the cushion rod may be extended and contracted by a working fluid other than oil. The working fluid is not limited to a liquid, and a gas may be used.

Further, in the present embodiment, the accumulator bracket is fixed to the engine. Alternatively, the accumulator bracket may be fixed to the vehicle body frame.

Further, in the present embodiment, the upper end portion of the rear cushion is supported by the engine and the vehicle body frame. Alternatively, the upper end portion of the rear cushion may be supported by the engine or the vehicle body frame.

Further, in the present embodiment, the cushion lever is supported by the vehicle body frame. Alternatively, the cushion rod may be supported by the engine.

Further, in the present embodiment, the accumulator is overlapped the cushion lever and the cushion rod in the side view of the vehicle. Alternatively, the accumulator may be overlapped the cushion lever or the cushion rod.

Further, in the present embodiment, the downstream portion of the muffler pipe is positioned on the right side of the vehicle center line, and the accumulator is positioned on the left side of the vehicle center line. Alternatively, the downstream portion of the muffler pipe may be positioned on the left side of the vehicle center line, and the accumulator may be positioned on the right side of the vehicle center line.

Further, in the present embodiment, the accumulator, the cushion lever, and the cushion rod are partitioned from the muffler pipe by the accumulator bracket. Alternatively, at least the accumulator and the muffler pipe may be partitioned.

In addition, the straddle-type vehicle is not limited to a general vehicle on which a rider rides in a posture of straddling a seat, and also includes a small-sized scooter type vehicle on which a rider rides without straddling a seat.

As described above, a rear wheel suspension device according to the present embodiment is a rear wheel suspension device (30) including a swing arm (31) swingably supported with respect to a vehicle body frame (10), the swing arm being configured to rotatably support a rear wheel (25), the rear wheel suspension device including: a rear cushion (33) configured to be extended and contracted in accordance with swing of the swing arm; a cushion lever (34) coupled to a lower end portion of the rear cushion; a cushion rod (35) coupling the cushion lever and the swing arm; an accumulator (51) storing a working fluid that extends and contracts the cushion rod; and an accumulator bracket (82) supporting the accumulator, in which a vehicle height is adjusted by displacement of the swing arm in accordance with extension and contraction of the cushion rod, a muffler pipe (90) extends rearward from an engine (15) through a side of the accumulator, and the accumulator bracket is configured to separate the accumulator and the muffler pipe. According to this configuration, the vehicle height is adjusted by extending and contracting the cushion rod by the working fluid of the accumulator. The vehicle height of the rear portion of the vehicle is lowered at the time of starting, or at the exit of a corner, so that stable acceleration can be performed in a posture in which the center of gravity is low. In addition, the accumulator bracket is disposed between the accumulator and the muffler pipe, so that the accumulator is protected from the hot air of the muffler pipe by the accumulator bracket.

In the rear wheel suspension device for a straddle-type vehicle according to the present embodiment, the accumulator bracket is configured to separate the muffler pipe and the cushion rod. According to this configuration, the accumulator bracket is disposed between the muffler pipe and the cushion rod, so that the cushion rod is protected from the hot air of the muffler pipe by the accumulator bracket.

In the rear wheel suspension device for a straddle-type vehicle according to the present embodiment, the accumulator bracket is configured to separate the muffler pipe and the cushion lever. According to this configuration, the accumulator bracket is disposed between the muffler pipe and the cushion lever, so that the cushion lever is protected from the hot air of the muffler pipe by the accumulator bracket.

In the rear wheel suspension device for a straddle-type vehicle according to the present embodiment, the accumulator bracket includes a front wall portion (83) covering the accumulator from a front side. According to this configuration, traveling wind is blocked by the front wall portion of the accumulator bracket, and the accumulator is protected from the hot air flowing rearward together with the traveling wind from the muffler pipe.

In the rear wheel suspension device for a straddle-type vehicle according to the present embodiment, the muffler pipe is bent in front of the accumulator and extends rearward through one side in a left-right direction with respect to a vehicle center line (L) extending in a front-rear direction of a vehicle, the accumulator is positioned on the other side in the left-right direction with respect to the vehicle center line, and the accumulator bracket includes a side wall portion (84) that covers the accumulator from a side, and the side wall portion is configured to separate the accumulator and a downstream side of a bent portion (94) of the muffler pipe. According to this configuration, the downstream side of the bent portion of the muffler pipe is closer to the one side in the left-right direction than the vehicle center line, so that an arrangement space of the accumulator can be secured on the other side in the left-right direction of the vehicle center line. Further, the accumulator is protected from the hot air from the downstream side of the muffler pipe by the side wall portion of the accumulator bracket.

In the rear wheel suspension device for a straddle-type vehicle according to the present embodiment, a front wall portion of the accumulator bracket is configured to separate the bent portion of the muffler pipe and the accumulator. According to this configuration, traveling wind is blocked by the front wall portion of the accumulator bracket, and the accumulator is protected from the hot air flowing rearward together with the traveling wind from the bent portion of the muffler pipe.

Although the present embodiment has been described, the above-described embodiment and the modification may be combined entirely or partially as another embodiment.

The technique of the present invention is not limited to the above-described embodiment, and various changes, substitutions, and modifications may be made without departing from the spirit of the technical idea of the present invention. The present invention may be implemented by other methods as long as the technical idea can be implemented by the methods through advance of the technique or other derivative techniques. Therefore, the claims cover all embodiments that may be included within the scope of the technical idea.

What is claimed is:

1. A rear wheel suspension device of a vehicle having a vehicle body frame, an engine and a rear wheel, the rear wheel suspension device comprising:
    a swing arm being configured to rotatably support the rear wheel,
    a rear cushion configured to be extended and contracted in accordance with swing of the swing arm;
    a cushion lever coupled to a lower end portion of the rear cushion;
    a cushion rod coupling the cushion lever and the swing arm;
    an accumulator storing a working fluid that extends and contracts the cushion rod; and
    an accumulator bracket supporting the accumulator,
    wherein displacement of the swing arm adjusts a vehicle height of the vehicle body frame in accordance with extension and contraction of the cushion rod,
    wherein a muffler pipe extends rearward from the engine along a side of the accumulator, and
    wherein the accumulator bracket is configured to separate the accumulator and the muffler pipe.

2. The rear wheel suspension device according to claim 1, wherein the accumulator bracket is configured to separate the muffler pipe and the cushion rod.

3. The rear wheel suspension device according to claim 2, wherein the accumulator bracket is configured to separate the muffler pipe and the cushion lever.

4. The rear wheel suspension device according to claim 1, wherein the accumulator bracket includes a front wall portion covering a front side of the accumulator in a front-rear direction of the vehicle.

5. The rear wheel suspension device according to claim 4,
wherein the muffler pipe is bent at a bent portion in front of the accumulator and extends rearward through one side in a left-right direction with respect to a vehicle center line extending in a front-rear direction of a vehicle,
wherein the accumulator is positioned on the other side in the left-right direction with respect to the vehicle center line, and
wherein the accumulator bracket includes a side wall portion covering a side of the accumulator in the left-right direction with respect to the vehicle center line, and the side wall portion is configured to separate the accumulator and a downstream side of the bent portion of the muffler pipe.

6. The rear wheel suspension device according to claim 5, wherein a front wall portion of the accumulator bracket is configured to separate the bent portion of the muffler pipe and the accumulator.

\* \* \* \* \*